(12) United States Patent
Daiminger et al.

(10) Patent No.: US 11,318,833 B2
(45) Date of Patent: May 3, 2022

(54) ADJUSTMENT MECHANISM COMPRISING A CLOSURE FLAP ADJUSTABLE IN A CONTACTLESS MANNER BY AN EXTERNAL FORCE

(71) Applicant: BROSE FAHRZEUGTEILE GMBH & CO. KOMMANDITGESELLSCHAFT, COBURG, Coburg (DE)

(72) Inventors: Ralf Daiminger, Bamberg (DE); Stefan Richter, Michelau (DE)

(73) Assignee: BROSE FAHRZEUGTEILE GMBH & CO. KOMMANDITGESELLSCHAFT, Coburg (DE)

( * ) Notice: Subject to any disclaimer, the term of this patent is extended or adjusted under 35 U.S.C. 154(b) by 786 days.

(21) Appl. No.: 16/070,508

(22) PCT Filed: Jan. 13, 2017

(86) PCT No.: PCT/EP2017/050685
§ 371 (c)(1),
(2) Date: Jul. 16, 2018

(87) PCT Pub. No.: WO2017/137210
PCT Pub. Date: Aug. 17, 2017

(65) Prior Publication Data
US 2021/0213828 A1    Jul. 15, 2021

(30) Foreign Application Priority Data

Feb. 12, 2016   (DE) .................... 10 2016 202 215.6

(51) Int. Cl.
*B60K 15/05*     (2006.01)
*E05F 15/73*     (2015.01)

(52) U.S. Cl.
CPC .............. *B60K 15/05* (2013.01); *E05F 15/73* (2015.01); *B60K 2015/053* (2013.01); *B60K 2015/0538* (2013.01); *B60K 2015/0561* (2013.01)

(58) Field of Classification Search
CPC .............. B60K 15/05; B60K 2015/053; B60K 2015/0538; B60K 2015/0523;
(Continued)

(56) References Cited

U.S. PATENT DOCUMENTS

| 4,817,813 A | 4/1989 | Krause |
| 4,886,182 A | 12/1989 | Fedelem et al. |

(Continued)

FOREIGN PATENT DOCUMENTS

| CN | 104521143 A | 4/2015 |
| CN | 104583519 A | 4/2015 |

(Continued)

OTHER PUBLICATIONS

WO-2012059100-A2, Pfeffer et al., "Method for a Motor Vehicle", Oct. 5, 2012, WIPO, Pertinent pages = 11-15 (Year: 2012).*

(Continued)

*Primary Examiner* — Dennis H Pedder
*Assistant Examiner* — Joyce Eileen Hill
(74) *Attorney, Agent, or Firm* — Lewis Roca Rothgerber Christie LLP

(57) ABSTRACT

It is provided an adjustment mechanism, comprising a closure flap for at least partially closing a closure opening on a vehicle, via which, when the closure flap is opened, a connection element for connecting a line and/or a port for topping up a liquid, in particular a fuel, is accessible, a drive for adjusting the closure flap by external force in response to an operator control event, and an electronic control unit which is coupled to the drive and by means of which the
(Continued)

drive is activated to open the closure flap in response to an operator control event which is detected in a contactless manner, and, on the other hand, is automatically stopped or reversed in so far as, when the closure flap closes, a possible obstacle is detected in a contactless manner in the adjustment path of the closure flap by means of an anti-pinch mechanism.

15 Claims, 12 Drawing Sheets

(58) Field of Classification Search
CPC ...... B60K 15/0507; E05B 83/34; E05F 15/73; E05Y 2900/534
USPC .................. 296/97.22; 49/31, 506, 26, 28
See application file for complete search history.

(56) References Cited

U.S. PATENT DOCUMENTS

| | | | |
|---|---|---|---|
| 6,234,555 | B1 | 5/2001 | Emmerich et al. |
| 9,121,687 | B2* | 9/2015 | Mori ........................ H03J 7/04 |
| 9,484,914 | B2* | 11/2016 | Pohl ........................ E05F 15/73 |
| 2005/0034776 | A1 | 2/2005 | Watkins |
| 2005/0039818 | A1 | 2/2005 | Bauer |
| 2009/0058132 | A1 | 3/2009 | Browne et al. |
| 2009/0079225 | A1 | 3/2009 | Katou |
| 2009/0309386 | A1 | 12/2009 | Yamamoto |
| 2011/0140477 | A1 | 6/2011 | Mihai |
| 2011/0146157 | A1 | 6/2011 | Bauer |
| 2012/0158253 | A1 | 6/2012 | Kroemke et al. |
| 2013/0055639 | A1* | 3/2013 | Brosseit ................ E05F 15/43 49/31 |
| 2013/0056994 | A1 | 3/2013 | Sago |
| 2013/0074411 | A1 | 3/2013 | Ferguson et al. |
| 2013/0154402 | A1 | 6/2013 | Basavarajappa et al. |
| 2013/0234828 | A1 | 9/2013 | Holzberg et al. |
| 2014/0039766 | A1 | 2/2014 | Miyake et al. |
| 2014/0330486 | A1* | 11/2014 | Gehin ..................... B60R 25/01 701/49 |
| 2015/0009062 | A1 | 1/2015 | Herthan |
| 2015/0025751 | A1* | 1/2015 | Sugiura ..................... B60J 5/06 701/49 |
| 2015/0048644 | A1 | 2/2015 | Georgi et al. |
| 2015/0231968 | A1 | 8/2015 | Dunger et al. |
| 2015/0267454 | A1 | 9/2015 | Wuerstlein et al. |
| 2015/0275561 | A1 | 10/2015 | Herrmann et al. |
| 2015/0375630 | A1 | 12/2015 | Jeong et al. |
| 2016/0010381 | A1 | 1/2016 | Wuerstlein et al. |
| 2016/0083981 | A1 | 3/2016 | Kondo et al. |
| 2016/0087375 | A1 | 3/2016 | Yoshizawa et al. |
| 2017/0001517 | A1 | 1/2017 | Herrmann et al. |
| 2017/0357246 | A1* | 12/2017 | Herthan ............... B60R 25/2054 |

FOREIGN PATENT DOCUMENTS

| | | |
|---|---|---|
| CN | 105051306 A | 11/2015 |
| DE | 3301072 A1 | 7/1984 |
| DE | 3637289 A1 | 5/1988 |
| DE | 8816045 | 2/1989 |
| DE | 4438610 A1 | 5/1996 |
| DE | 4440814 A1 | 5/1996 |
| DE | 69400812 T2 | 2/1997 |
| DE | 19535335 A1 | 3/1997 |
| DE | 1983291 | 1/1999 |
| DE | 29921802 U1 | 3/2000 |
| DE | 19919251 A1 | 11/2000 |
| DE | 19935454 A1 | 3/2001 |
| DE | 10117536 A1 | 10/2002 |
| DE | 10153724 A1 | 5/2003 |
| DE | 102006042447 A1 | 11/2007 |
| DE | 112007000117 T5 | 11/2008 |
| DE | 102008040001 A1 | 5/2009 |
| DE | 102009023594 A1 | 12/2010 |
| DE | 102009058864 A1 | 6/2011 |
| DE | 102011111234 A1 | 2/2013 |
| DE | 102011114383 A1 | 3/2013 |
| DE | 102012009018 A1 | 11/2013 |
| DE | 202012007455 U1 | 12/2013 |
| DE | 102012110383 A1 | 4/2014 |
| DE | 102012021518 A1 | 5/2014 |
| DE | 102013010993 A1 | 1/2015 |
| DE | 102013215815 A1 | 2/2015 |
| DE | 102014111408 A1 | 2/2015 |
| DE | 102014100580 A1 | 7/2015 |
| EP | 0630074 A2 | 12/1994 |
| EP | 0704331 A1 | 4/1996 |
| EP | 0922601 A1 | 6/1999 |
| EP | 1293374 A1 | 3/2003 |
| EP | 1449702 A2 | 8/2004 |
| EP | 1464529 A2 | 10/2004 |
| EP | 1785307 A1 | 5/2007 |
| EP | 2392755 A2 | 12/2011 |
| EP | 2897006 A1 * | 7/2015 ............. E05F 15/73 |
| EP | 2897006 B1 | 5/2016 |
| ER | 0621154 B1 | 10/1994 |
| FR | 2625141 | 4/1990 |
| FR | 2765837 A1 | 1/1999 |
| FR | 2817511 A1 | 6/2002 |
| FR | 2915144 A1 | 10/2008 |
| FR | 2940772 A1 | 7/2010 |
| JP | 59-128015 | 7/1984 |
| JP | 2002285755 A | 10/2002 |
| JP | 2005133529 A | 5/2005 |
| JP | 2008-168748 | 7/2006 |
| JP | 2009-101755 | 5/2009 |
| JP | 2012-056327 | 3/2012 |
| JP | 2012-219469 | 11/2012 |
| JP | 2013-57181 | 3/2013 |
| JP | 2014-500414 | 1/2014 |
| JP | 2014-177819 A | 9/2014 |
| WO | WO 02/081248 A2 | 10/2002 |
| WO | WO 2008/084815 A1 | 7/2008 |
| WO | WO 2011/147593 A1 | 12/2011 |
| WO | WO-2012059100 A2 * | 5/2012 ......... B60R 25/2045 |
| WO | WO 2013/041081 A2 | 3/2013 |
| WO | WO 2014/067883 A2 | 5/2014 |
| WO | WO 2014/171035 A1 | 10/2014 |
| WO | WO 2014/184980 A1 | 11/2014 |
| WO | WO 2015/114154 A2 | 8/2015 |

OTHER PUBLICATIONS

Sanborn, "Device For Contactlessly Actuating a Sliding Door of a Motor Vehicle", Jul. 22, 2015, EP2897006A1 (Year: 2015).*
Japanese Notification of Reasons for Rejection dated Oct. 6, 2020 cited in corresponding Japanese Application No. 2018-542175, 4 pages, with an English translation, 4 pages.
Chinese First Office action dated Feb. 3, 2021 issued in corresponding Chinese Patent Application No. 2017800112225, 8 pages, with English translation, 3 pages.

* cited by examiner

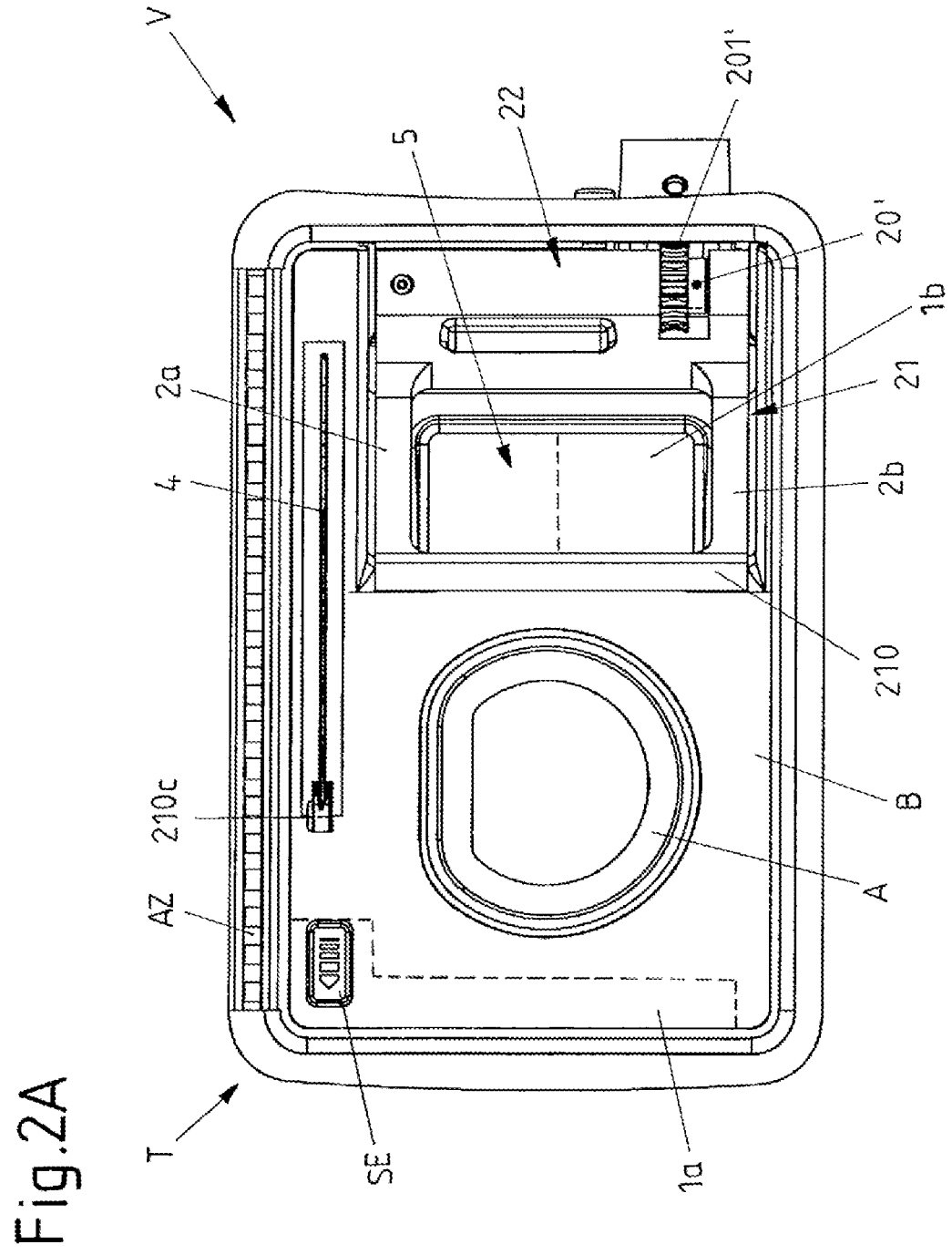

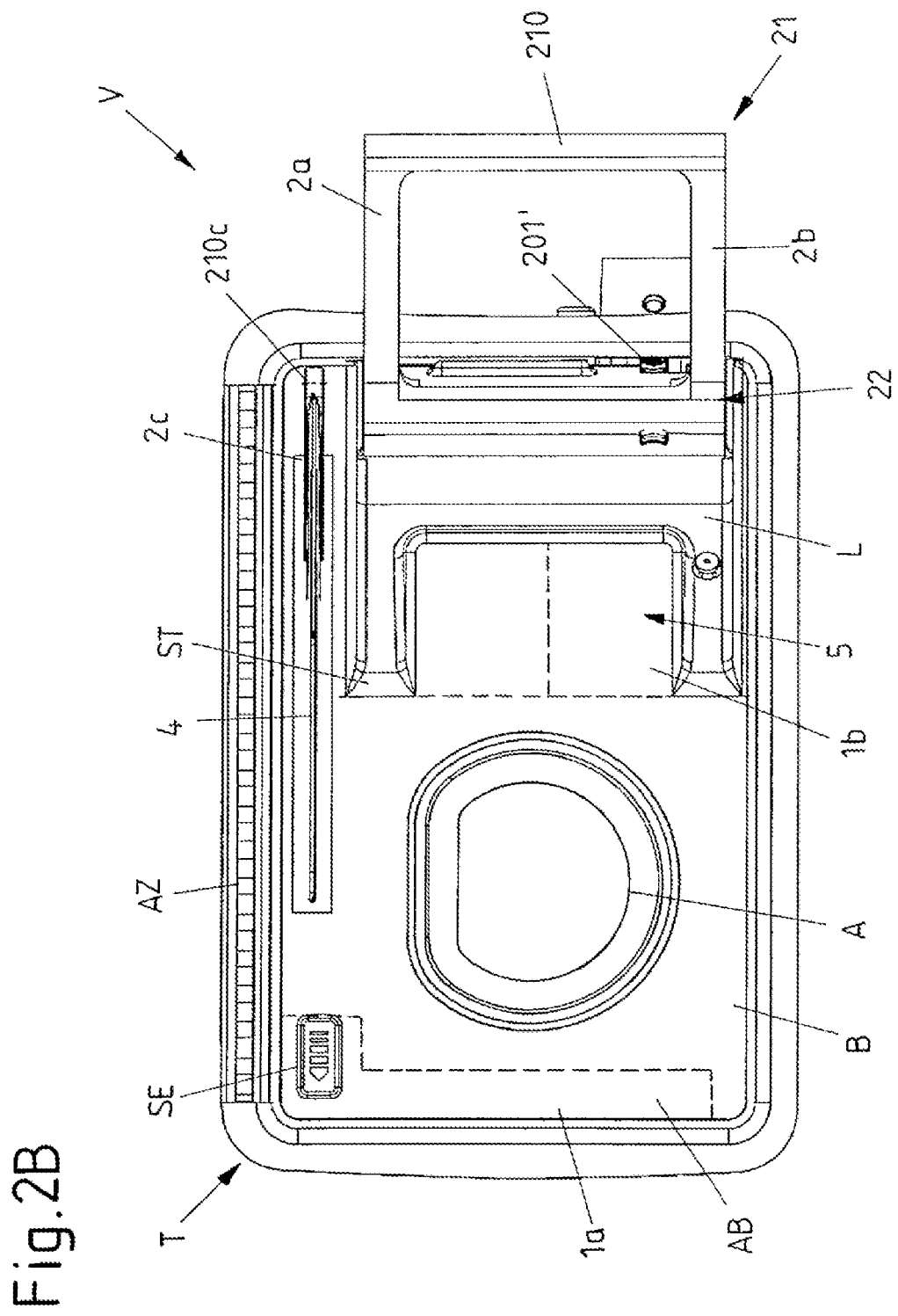

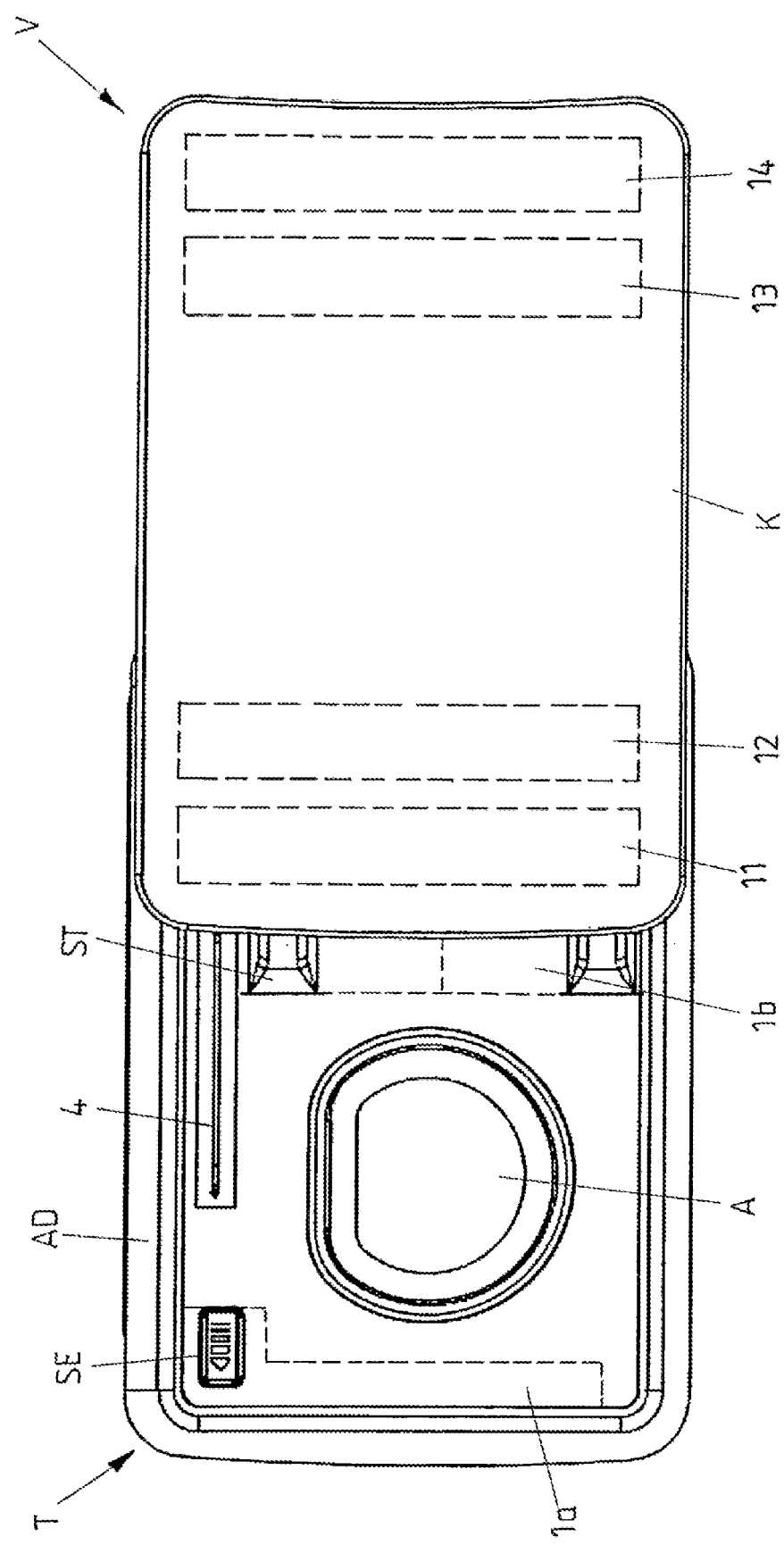

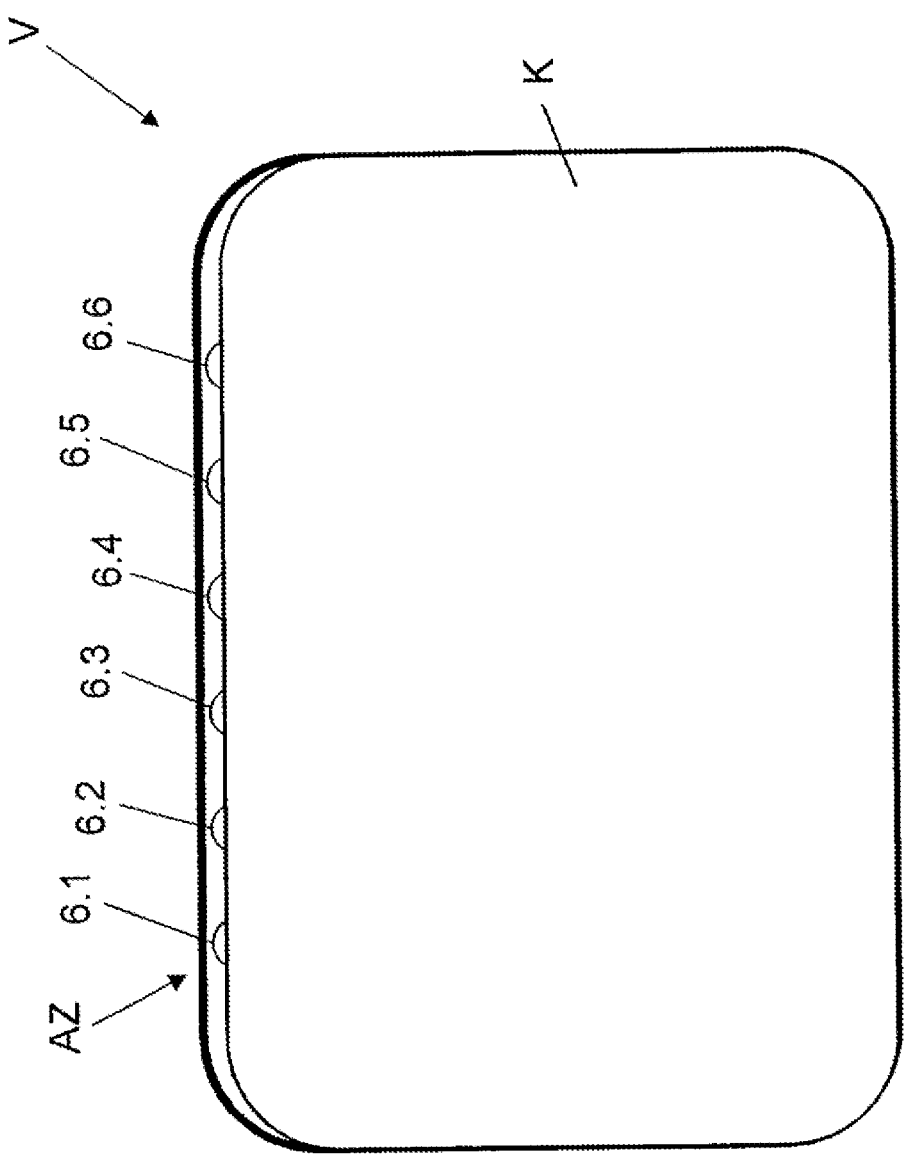

ADJUSTMENT MECHANISM COMPRISING A CLOSURE FLAP ADJUSTABLE IN A CONTACTLESS MANNER BY AN EXTERNAL FORCE

CROSS-REFERENCE TO A RELATED APPLICATION

This application is a National Phase Patent Application of International Patent Application Number PCT/EP2017/050685, filed on Jan. 13, 2017, which claims priority to and the benefit of German Patent Application Number 10 2016 202 215.6, filed on Feb. 12, 2016, the contents of all of which are incorporated herein by reference.

BACKGROUND

The present invention relates to an adjustment mechanism.

Such an adjustment mechanism has at least one closure flap for at least partially closing a closure opening on a vehicle via which, when the closure flap is opened, a connection element for connecting a line and/or a port for topping up a liquid, in particular a fuel, is accessible. The closure flap is, for example, a tank flap or a tank cover on the vehicle via which a port for topping up wiping liquid or oil is accessible. Likewise, the closure flap can be a cover flap or a cover which covers a connection socket for a charging cable in an electric vehicle in a protective fashion. A depression or a cavity on the vehicle bodywork, within which there is e.g. a tank opening or a connection socket, is usually covered by means of the closure flap.

As a result of increasing automation and in order to improve comfort, such closure flaps on a vehicle can nowadays be adjusted with actuation by external force by means of a generally electric-motor-powered drive. Such a solution is shown, for example, by WO 2015/114154 A2.

Adjustment mechanisms which have been known hitherto from practice and which have such closure flaps generally have a comparatively costly and/or bulky mechanical adjustment system which takes up a large amount of installation space within the depression/cavity or adjacent thereto and are awkward to operate. The adjustment mechanism of WO 2015/114154 A2 already constitutes a significant improvement in this regard. However, there is also potential for improvement of such an adjustment mechanism with respect to increased operator control comfort.

SUMMARY

An object of the present invention is therefore to make available a closure mechanism which is improved in this regard and can be operated more easily and/or reliably.

This object is achieved with an adjustment mechanism with features as described herein.

According to the invention, an adjustment mechanism is proposed which comprises a closure flap for at least partially closing a closure opening on a vehicle. When the closure flap is opened, a connection element for connecting a line and/or a port for topping up a liquid is accessible via the closure opening. The adjustment mechanism also comprises a drive for adjusting the closure flap by external force in response to an operator control event, and an electronic control unit which is coupled to the drive. In this context, by means of the control unit the drive can, on the one hand, be activated to open the closure flap in response to an operator control event which is detected in a contactless manner and, on the other hand, can be automatically stopped or reversed in so far as, when the closure flap closes, a possible obstacle is detected in a contactless manner in the adjustment path of the closure flap by means of an anti-pinch mechanism.

In an adjustment mechanism according to the invention, a sensor system for the contactless detection of an operator control event which is decisive for the opening of the closed closure flap is therefore combined with an anti-pinch mechanism which can detect possible obstacles in the adjustment path of the closing closure flap. In this context, the anti-pinch mechanism prevents, for example, a user's hand from being pinched between the closing closure flap and part of the vehicle bodywork. The detection of obstacles is also carried out here in a contactless manner, preferably capacitively or inductively.

A port is preferably designed and provided for filling in consumables on a vehicle. A consumable can be, for example, an energy carrier for the vehicle drive, such as for example fuel, in particular gasoline, diesel, compressed air or hydrogen, or a consumable liquid, such as for example engine oil, cooling liquid or wiping liquid for a windshield wiper system. On the other hand, a connecting element is preferably designed and provided for connecting a line. A connecting element is consequently understood in this context to be, in particular, a connection possibility for a charging cable, in order to charge a battery of the vehicle, in particular the battery of an electric vehicle or hybrid vehicle.

In one exemplary embodiment, at least one electrode is provided which is used both to detect an operator control event, in order to open the closure flap, and as part of the anti-pinch mechanism. The at least one electrode therefore forms a double function and serves, on the one hand, to detect an operator control event and, on the other hand, forms part of the anti-pinch mechanism.

In this context, according to one variant there may be provision that the electronic control unit is configured
  (a) to evaluate, for the opening of the closure flap, whether a measured value which is acquired by means of the at least one electrode exceeds a threshold value, and
  (b) to compare, when the closure flap closes, at least one measured value acquired by means of the at least one electrode with an anticipated value.

When the closure flap is closed, the at least one electrode is therefore e.g. initially used merely to check whether a specific threshold value for a measured capacitance exceeds a stored threshold value, in order to determine a possible operator control event at the closure flap. For example, a measurable change in capacitance in the surroundings of the closure flap occurs as a result of a hand approaching the closed closure flap. If the measured capacitance exceeds a stored threshold value, this is evaluated as an operator control event or at least as a first indicator for a possible operator control event, if, for example, the opening of the closure flap is to be capable of being triggered with only a specific gesture. When the closure flap is closed, absolute measurement is therefore carried out by means of the at least one electrode in order to detect a possible operator control event.

A threshold value which is stored for the detection of an operator control event can basically be adaptable, in particular over an operating time of the adjustment mechanism, for example as a function of changing external environmental conditions. In particular, the threshold value can be adaptable as a function of an (external) temperature or of moisture in the region of the closure flap. For this purpose, in one embodiment variant, the electronic control unit is coupled to at least one sensor which supplies at least one measured value, e.g. for the temperature or moisture, and the control unit is configured to adapt the threshold value as a function of this at least one measured value, that is to say to increase it or reduce it or replace it with a new, i.e. newly calculated, threshold value.

Adaptation of a threshold value on the basis of changed environmental conditions also includes an embodiment variant in which, in the case of a closure flap which has been closed properly, a basic measured value, e.g. a basic capacitance, is measured and the threshold value is adapted as a function thereof. If, e.g. in the case of a closed closure flap, this basic measured value is changed beyond a tolerance which is defined as permissible, the basic measured value is updated, and the threshold value is also adapted to a corresponding degree. In one variant, when the adjustment mechanism is activated, in particular in the case of waking up from an idle mode or sleep mode a threshold value is automatically adapted as a function of a measured basic capacitance.

When the closure flap is opened, a measured value which is acquired by the at least one electrode is compared with at least one stored anticipated value or reference value, in order to infer, in the case of possible deviation of the measured value—beyond a permissible tolerance—that there is a possible obstacle in the adjustment path of the closing closure flap. The anticipated value constitutes here a setpoint measured value for a disruption-free, i.e. obstacle-free, adjustment movement of the opened closure flap into a closed position.

In this context it is also possible to provide that a memory is provided in which an anticipated value is respectively stored for different positions of the closure flap along an adjustment path of the closure flap, and the electronic unit is configured to carry out, when the closure flap closes, a position-resolved comparison of measured values, acquired by means of the at least one electrode, with stored anticipated values. It is therefore respectively checked at the different positions to what extent a measured value corresponds to a stored anticipated value. If an impermissible deviation is detected, an obstacle in the adjustment path of the closing closure flap is determined.

In one development, an evaluation logic of the electronic control unit is also configured to determine if there may be a malfunction of the closure mechanism within the scope of a diagnostic function on the basis of individual measured values deviating from anticipated values. In this variant, the electronic control unit is configured and provided to evaluate, on the basis of measured values acquired when the closure flap closes, and their comparison with stored anticipated values, both whether there is an obstacle in the adjustment path of the closing closure flap and whether the adjustment of the closure flap is no longer proceeding correctly, for example owing to wear. The diagnostic function can also be carried out when the closure flap opens.

The anticipated values which are stored in the memory of the adjustment mechanism have been stored, for example, by means of calibration in the case of obstacle-free adjustment or a plurality of obstacle-free adjustments of the closure flap from its opened position into its closed position and/or in the case of adjustment from its closed position into the opened position. In this context it is also possible to provide that during operation of the adjustment mechanism adaptive adjustment of the stored anticipated values takes place over at least one later obstacle-free adjustment. For example, for this purpose the stored anticipated values can be overwritten at each obstacle-free adjustment of the closure flap into its closed position or into the opened position, in order, as a result, to carry out adaptation to any wear phenomena or changed environmental conditions. It is alternatively possible to provide that corresponding adaptation of a stored anticipated value is carried out in each case only after a specific number of adjustment cycles which occur without disruption. The stored anticipated values are therefore adapted, for example, only every 5, 10 or more adjustment cycles.

Adaptation of at least one anticipated value which is stored in the memory can, of course, take place not only by simple overwriting with a newly acquired anticipated value. (Adaptive) adjustment of a stored anticipated value rather also includes situational inputting of a specific variable offset value to form an anticipated value which is stored in the memory. Such an offset value allows, for example, for changed temperatures or increased moisture in the region of the closure flap, as a result of which, in particular, measurable capacitance values can change.

The at least one electrode can also be used, when the closure flap is closed, to trigger waking up of the electronic control unit in response to a waking event. It is therefore possible to provide, for the sake of saving energy, that the electronic control unit can be operated in a sleep mode in which, for example, just one of a plurality of electrodes is actuated. If an increased capacitance is detected at this one electrode, for example because a user's hand approaches the closed closure flap, the electronic control unit wakes up and changes into an operating mode in which the other electrodes are also actuated and their measured values evaluated by the electronic control unit, in order to monitor the surroundings of the closure flap for the occurrence of a possible operator control event.

If at least one electrode of the adjustment mechanism is used both for the detection of a wakeup event, in order to make the electronic control unit switch from a sleep mode into an active operating mode, and for the detection of an operator control event, there can be provision that at least two threshold values are stored for this one electrode in the electronic control unit. If a capacitance, measured by means of the electrode, in the surroundings of the closure flap exceeds a (relatively low) threshold value in the sleep mode of the control unit, this is evaluated as a wakeup event. If subsequent to this when the electronic control unit is woken up, this electrode is subsequently used to measure a capacitance which also exceeds the (relatively high first) threshold value, this is evaluated as an operator control event or at least as part of the operator control event. When evaluation as part of an operator control event occurs, a (second) threshold value for a measured capacitance must be exceeded, for example, at at least one further electrode of the closure mechanism, and this must consequently occur in a specific chronological sequence with respect to the exceeding of a capacitance value which is measured for the first electrode. If the changes in capacitance which are measured at different electrodes occur in a characteristic size and sequence, it is possible to determine the execution of a specific gesture in the surroundings of the closed closure flap, for example in wiping movement which is executed with a user's hand, and which then serves as a trigger for the opening of the closure flap.

In order to avoid any incorrect triggering, in one variant the electronic control unit is configured to only trigger opening of the closure flap and/or only to "wakeup" if the (respective) threshold value is exceeded by the at least one acquired measured value at least for a predefined time period. This includes, in particular, the fact that it is detected whether a specific number of a plurality of preferably (directly) successive measured values respectively exceeds the threshold value and as a result it is inferred that the (respective) threshold value is exceeded for a predefined time period.

As already mentioned above, it is advantageous, in particular for a contactless detection of a gesture as an operator control event, said gesture being executed in the surroundings of the closed closure flap, to provide at least two electrodes which are coupled to the electronic control unit.

In one possible embodiment variant, the at least two electrodes and the electronic control unit are then configured
(a) to detect, for the opening of the closure flap, a specific gesture of a user, executed in the surroundings of the closed closure flap, as an operator control event, and
(b) to acquire, when the closure flap closes, measured values and compare them with anticipated values stored in the electronic control unit in order to determine in a contactless manner a possible obstacle in the adjustment path of the closure flap.

The electronic control unit can be configured here to evaluate, for the opening of the closure flap, whether measured values, acquired by means of different electrodes, in a predefined sequence exceed first and second threshold values. In this way it is possible, for example, to detect, in a contactless manner, a wiping movement during which an increased capacitance value can be measured by a user's hand firstly on the one electrode and subsequently on the other electrode which is spaced apart (spatially) therefrom.

In one embodiment variant, at least one electrode
(a) is used to acquire a measured value for the opening of the closure flap, in order to detect an operator control event, and
(b) is used for electromagnetic shielding when the closure flap closes.

The respective electrode is correspondingly actuated here by means of the electronic control unit, with the result that the latter can be used differently in two operating modes, on the one hand for acquiring a measured value for the detection of an operator control event which triggers the opening of the closed closure flap and, on the other hand, as a guard electrode by means of which an electrical field of another electrode is influenced, which is used, when the closure flap closes, to detect a possible obstacle in the adjustment path of the closing closure flap. The at least one electrode here is consequently used, on the one hand, for opening the closure flap in order to detect an operator control event and, on the other hand, as a guard electrode in order to improve a detection of a possible obstacle in the adjustment path of the closing closure flap by means of at least one further electrode. The one electrode which is used for the opening of the closure flap is therefore also part of the anti-pinch mechanism, but here is not itself used to detect an obstacle but instead is used as a guard electrode.

Against this background, in one development, at least one further electrode is provided as part of the anti-pinch mechanism by means of which a measured value for detecting a possible obstacle in the adjustment path of the closing closure flap to be closed is acquired, wherein the electrode which is used for the opening the closure flap to detect an operator control event is used, when the closure flap closes, as a guard electrode for this at least one further electrode.

In this variant it is also possible for a gesture to be evaluated as an operator control event for the opening of the closure flap. For this purpose, at least three electrodes are then provided. These electrodes and the electronic control unit are then configured
(a) to detect, for the opening of the closure flap by means of some of the electrodes, a specific gesture of a user, executed in the surroundings of the closed closure flap, as an operator control event, and
(b) to acquire measured values by means of some other of the electrodes when the closure flap closes and compare said measured values with anticipated values stored in the electronic control unit, in order to determine in a contactless manner a possible obstacle in the adjustment path of the closure flap.

It is therefore possible for at least two of the electrodes to be provided for the detection of the gesture and two of the electrodes for the detection of a possible obstacle, wherein at least one electrode, which is used for the detection of a gesture to open the closure flap when the closure flap is closed, is used as a guard electrode, and consequently operated as a guard electrode, when the closure flap closes.

In this context, for example a first and a second electrode are used for gesture detection. When the closure flap closes, the first electrode and a third electrode are used for capacitive detection of a possible obstacle in the adjustment path of the closing closure flap. The second electrode then functions as a guard electrode while the closure flap closes.

The at least one electrode which is used as a guard electrode when the closure flap closes should be connected to ground here.

In one development, for example four electrodes are provided. In this context, two electrodes then serve to detect an operator control event when the closure flap closes and two other electrodes are used to detect a possible obstacle and therefore to sense a possible case of pinching when the closure flap closes. If the closure flap is opened, only the electrodes which are used to detect an operator control event are interrogated. If the closure flap is then closed, the other two electrodes are interrogated. While the closure flap closes, a capacitance which can be measured by means of the electrodes with respect to the vehicle bodywork changes.

A corresponding change in a measurable capacitance without an obstacle constitutes here an anticipated value which is maintained in the case of obstacle-free adjustment. In order to improve the measurement when the closure flap closes, the two electrodes which have been used to detect the operator control event when the closure flap is closed are used as guard electrodes. Switching over between a detection function and a shielding function therefore takes place at these electrodes as a function of the adjustment position (closed/open) or the adjustment direction (in the direction of the opened position/in the direction of the closed position) of the closure flap.

Using corresponding shielding by means of at least one electrode it is possible here to ensure, for example in a particularly easy way, that any objects which are present on an outer side of the closure flap are not incorrectly detected as possible obstacles which would be pinched between the closure flap and a vehicle bodywork on the inner side of the closure flap when the closure flap closes.

In one preferred embodiment, the closure flap is manufactured from a plastic material. This facilitates the capacitive sensing.

An electrode can basically be formed, for example, by leadframes, a copper strip or a copper foil. The at least one electrode can also be embedded in the material of a supporting structure of the adjustment mechanism, e.g. in the material of a housing part. In this context, the electrode can be encapsulated by injection molding using (plastic) material which is employed to manufacture the housing part. Alternatively, the at least one electrode can subsequently be attached to the supporting structure or the housing part which has already been finished, for example can be bonded thereto.

A connection of a leadframe to a voltage supply and/or a bus line of an electronic control unit can be carried out, for example, by means of press fit pins on the leadframe. Analogously, motor contacts of the drive can also be connected by means of what are referred to as press fit pins or direct circuit board plugs. In particular, for this purpose the sensor device can comprise a circuit board by means of which the motor contacts of the drive are connected. When a circuit board is used, and in particular electrodes which are not embodied by means of a leadframe are used, electrical contact between an electrode and the circuit board can also be formed by means of a plug-type connector or a pressure contact.

A circuit board of the sensor device is preferably arranged on a supporting structure of the adjustment mechanism. When the electrode is embodied as part of a capacitive or inductive sensing device for detecting an operator control event, in one embodiment variant a sensor face, by means of which an operator control event can be detected in a contactless manner for the adjustment of the closure flap, is formed above a rear side of the circuit board.

In order to conceal an electrode in the correctly installed state of the adjustment mechanism, a panel section can be provided, which covers the at least electrode. The panel section can be formed here by means of plastic material which has been integrally injection molded on or by means of a subsequently attached panel.

In one variant, the panel section also extends at least partially over the region of the adjustment mechanism which has the connection element and/or the port. In this way, a uniform surface which faces the user when the closure flap is opened can be obtained comparatively easily. When there are a plurality of electrodes, they can also be covered in a protective fashion by the same panel section.

At least one electrode which is coupled to the electronic control unit and by means of which an operator control event for opening the closure flap can be detected and/or which is operated as part of the anti-pinch mechanism when the closure flap closes, can be arranged on a supporting structure, having the closure element and/or the port, of the adjustment mechanism or on the closure flap itself. The electrode is therefore arranged on another of the supporting structures of the adjustment direction which are secured in an immobile fashion to the vehicle bodywork or of the closure flap which is adjustable in relation thereto.

In one embodiment variant, the adjustment mechanism has a lever mechanism which is coupled to the drive and has at least two pivoting levers which can pivot about different pivoting axes, wherein an adjustment force for adjusting the closure flap with activation by external force can be transmitted via the lever mechanism.

A first pivoting lever is preferably pivotable about its pivoting axis by means of a drive shaft which is driven by the drive, in order to adjust the closure flap, and a second pivoting lever, which serves for the purpose of stabilization, is pivotable about its pivoting axis—preferably parallel to the other pivoting axis—by the adjustment of the closure flap.

The at least one first pivoting lever is therefore driven by the drive, while the at least one second pivoting lever is merely adjusted by its connection with the closure flap and predefines, in combination with the at least one first pivoting lever, the adjustment path for the closure flap during the opening and closing. The two different first and second pivoting levers are therefore connected to the closure flap at different points and preferably respectively articulated thereon, with the result that the closure flap remains oriented parallel to the pivoting axes when said closure flap is opened or closed. The closure flap is therefore not simply pivoted up by the lever mechanism with its pivotable pivoting levers but rather can also be driven by means of the lever mechanism to carry out an adjustment movement, during which the closure flap remains oriented in a constant fashion during the opening along a first spatial direction and a second spatial direction running transversely with respect to the first spatial direction. In this way, for example when opening occurs, the closure flap is initially raised from a support edge, at least partially surrounding the connection element and/or the port, and subsequently pivoted laterally away in order to make the connection element and/or the port accessible from the outside. Such adjustability of the closure flap by means of the lever mechanism can be optimized, in particular, by virtue of the fact that the pivoting axes of the pivoting levers run off-center with respect to the closure opening, that is to say with an offset with respect to a centrally running longitudinal or transverse axis.

The abovementioned adjustment movement is also alternatively or additionally assisted by the formation of one or more of the pivoting levers as angle levers. An angle lever is understood to be here a lever which has two limbs which run with respect to one another at an angle of ≠180° (that is say unequal to 180°), preferably in the range from 45° to 135°. Such an angle lever is preferably mounted at the end of one of its two limbs in such a way that it can pivot about the respective pivoting axis.

The closure flap can be
  opened essentially upward or downward with respect to a vehicle vertical axis or
  opened essentially forward or rearward with respect to a vehicle longitudinal axis,
in a reliable and space-saving fashion in a manner activated by external force in a state of the adjustment mechanism in which it is installed correctly on a vehicle.

In this context it is preferred, as already explained, that an adjustment path, in which the spatial orientation of the closure flap does not change with respect to the vehicle vertical axis and/or the vehicle longitudinal axis, is predefined to the closure flap by means of the lever mechanism. The closure flap is consequently coupled to the lever mechanism in such a way that during adjustment with activation by external force the closure flap is not tilted or rotated.

In one embodiment variant, all the pivoting levers or at least one of the pivoting levers are/is respectively connected to the closure flap at a lever end, e.g. by means of a clip connection.

In order to transmit an adjustment force the pivoting levers, the drive can have a gear mechanism. In this context, for example a first gearwheel element, which can be driven by a drive motor of the drive, meshes with a second gearwheel element, which is connected in a rotationally fixed fashion to at least one pivoting lever. In one embodiment variant, one of the gearwheel elements is embodied e.g. as a worm gear.

In one embodiment variant, the driven second gearwheel element is connected in a rotationally fixed fashion to a drive shaft, to which at least one of the pivoting levers is secured, in order to transmit a drive torque to this pivoting lever.

In an alternative embodiment variant, the driven second gearwheel element is secured, for example, by means of one or more bearing pins, in a rotationally fixed fashion to a bearing part to which a pivoting lever or a plurality of pivoting levers is/are connected. In a development which is based thereon, two pivoting levers which are oriented in parallel with respect to one another are part of an adjustment bow and are rigidly connected to one another for this purpose by means of a connecting piece, preferably at their lever ends which are coupled to the closure flap. The adjustment bow with the two pivoting levers is formed in one piece here, for example with the bearing part. In order to accommodate the adjustment bow in as compact a way as possible here in the closed state of the closure flap, the pivoting levers preferably extend at an angle with respect to the bearing part with the driven second gearwheel element. The driven second gearwheel element can also be integrally formed on the bearing part here in that the bearing part forms an external toothing system with which the first gearwheel element which can be driven by a drive motor of the drive meshes. If the second gearwheel element is embodied with respect thereto as a separate component and is connected in a rotationally fixed fashion to the bearing part, the bearing part and the second gearwheel element can be more easily manufactured from various materials. For example, the bearing part with the adjustment bow which is integrally formed thereon and which comprises the two pivoting levers can be manufactured from a plastic, in order to save weight, while the second gearwheel element can be manufactured from a metallic material.

In one embodiment variant, an adjustment bow with two (first) pivoting levers which run in parallel with respect to one another and are rigidly connected to one another by means of a connecting piece are provided, wherein the adjustment bow can be driven by a drive motor of the drive, in order to adjust the closure flap. In addition, a plurality of further (second) pivoting levers, or else just a single further (second) pivoting lever can be provided, by means of which pivoting levers or pivoting lever the closure flap is secured in a constant orientation with respect to the pivoting axes of the lever mechanism when an adjustment movement takes place. In one embodiment variant, the adjustment bow and a single further pivoting lever are arranged and mounted in such a way that in the closed state of the closure flap the pivoted-in adjustment bow lies with its lever ends next to the connection element and/or the port, while the lever end of the single further pivoting lever protrudes above or below the connection element and/or the port. In particular in such an embodiment variant there can be provision that the single pivoting lever is guided through a through-opening on a paneling part, which through-opening lies opposite the closed closure flap and covers at least parts of an electronics system and of the drive of the adjustment mechanism, with the result that the mounting of the single pivoting lever, which is preferably not driven itself but instead entrained, is concealed by the paneling part and therefore cannot be seen from the outside (even when the closure flap is opened).

In one exemplary embodiment, four pivoting levers are provided which are mounted in pairs so as to be pivotable about a pivoting axis on a housing-like supporting structure of the closure mechanism, relative to which supporting structure the closure flap can be adjusted. The drive can also be arranged on or in this supporting structure.

An operator control element, which is configured to sense when contact occurs, can be provided for closing the closure flap, with the result that a user must actively make contact with or even press the operator control element for an operator control event to be detected. Of course, there may be alternatively or additionally be provision that in order to trigger closing of the opened closure flap, a gesture detection system is once again implemented. It is therefore possible, for example, to detect a wiping movement in the direction of the exposed connection element and/or of the exposed port—and preferably along an adjustment axis along which the closure flap can be adjusted, in particular is slideable—as an operator control event for closing the opened closure flap.

In the field of vision of the closure mechanism it is additionally also possible to provide at least one display element, in order to display visually an operating state of the adjustment mechanism, in particular a current position of the closure flap, a filling level of a fuel tank or a battery of the vehicle and/or an indication of the finger movement or hand movement which is to be carried out in order to adjust the closure flap, to a user. Such a display element preferably comprises one or more LEDs.

There can therefore be provision for,
at least one sensor element to be provided for controlling the adjustment of the closure flap with activation by external force, by means of which sensor element it is possible to sense a finger movement or hand movement of a user which can be evaluated as an operator control event for adjusting the closure flap, and
at least one display element to be provided, by means of which both an operating state of the adjustment mechanism and/or a filling level of a fuel tank or a battery of the vehicle and an indication of the finger movement or hand movement which is to be carried out for adjusting the closure flap are/is displayed visually to the user.

The sensor element can be here, as already explained, part of a capacitive sensing device by means of which an operator control event can be detected in a contactless manner for the adjustment, in particular opening and/or closing, of the closure flap.

Therefore, for example, the current position of the closure flap and a filling level of a fuel tank or a battery of the vehicle is displayed to a user by means of the at least one display element, which comprises e.g. an LED light rail. For example, for this, the LEDs can light up in different colors or luminous intensities as a function of the respective filling level. Furthermore, the same LEDs can be actuated in such a way that they light up alternately a specific sequence individually or in pairs or groups, in order to display to a user a direction of movement for the finger movement or hand movement to be carried out, with the result that said movement can be detected as a permissible operator control event.

According to a further aspect of the invention, a method for controlling the adjustment movement of a closure flap is proposed.

A closure opening on a vehicle can also be closed here at least partially by means of the closure flap, by means of which closure opening a connection element for connecting a line and/or a port for topping up a liquid is accessible when the closure flap is opened. In order to adjust the closure flap with activation by external force, a drive is provided which according to the invention is activated, on the one hand, in response to an operator control event which is detected in a contactless manner, to open the closure flap, and, on the other hand, is stopped or reversed automatically in so far as, when the closure flap closes, a possible obstacle in the adjustment path of the closure flap is detected in a contactless manner by means of an anti-pinch mechanism. Consequently, with a control method according to the invention an anti-pinch mechanism is also provided in addition to a sensor system for the adjustment of the closure flap which can be triggered in a contactless manner, in order to prevent pinching of an obstacle between the closure flap which is closing and the vehicle bodywork when the closure flap is correctly arranged at the closure opening.

In this context, in order to optimize and save electronic components, at least one electrode can be operated in a double function within the scope of an embodiment variant of a control method according to the invention.

According to a first alternative, there is, for example, provision that (a) for the opening of the closure flap it is evaluated whether a measured value which is acquired by means of at least one electrode exceeds a threshold value, and
(b) when the closure flap closes, at least one measured value which is acquired by means of the at least one electrode is compared with an anticipated value.

The at least one electrode is therefore used for different functions when the closure flap is closed and during the closing of the closure flap.

This is basically also the case in an alternative embodiment variant in which at least one electrode is provided which
(a) is used to acquire a measured value for the opening of the closure flap, in order to detect an operator control event which triggers the opening of the closure flap, and
(b) is used for electromagnetic shielding when the closure flap closes.

Details of this have already previously been explained for a corresponding embodiment variant of an adjustment mechanism according to the invention.

A control method according to the invention can consequently be implemented by means of an adjustment mechanism which is configured according to the invention. The advantages and features which are explained above and below in conjunction with an adjustment mechanism according to the invention therefore also apply to embodiment variants of a control method according to the invention, and vice versa.

BRIEF DESCRIPTION OF THE DRAWINGS

The appended figures illustrate by way of example possible embodiment variants of the invention.

FIGS. 1A to 2B show an exemplary embodiment of an adjustment mechanism according to the invention with a laterally adjustable closure flap in different views without the closure flap being illustrated.

FIGS. 3A and 3B show the adjustment mechanism in FIGS. 1A to 2B with the closure flap in the closed and opened states.

FIGS. 5A to 5D show an adjustment mechanism according to the invention with a display element which informs a user visually, on the one hand, about the operating state and/or a filling level of a fuel tank or of a battery and, on the other hand, provides information about a gesture which is to be carried out to open the closure flap.

DETAILED DESCRIPTION

Figure 1A:
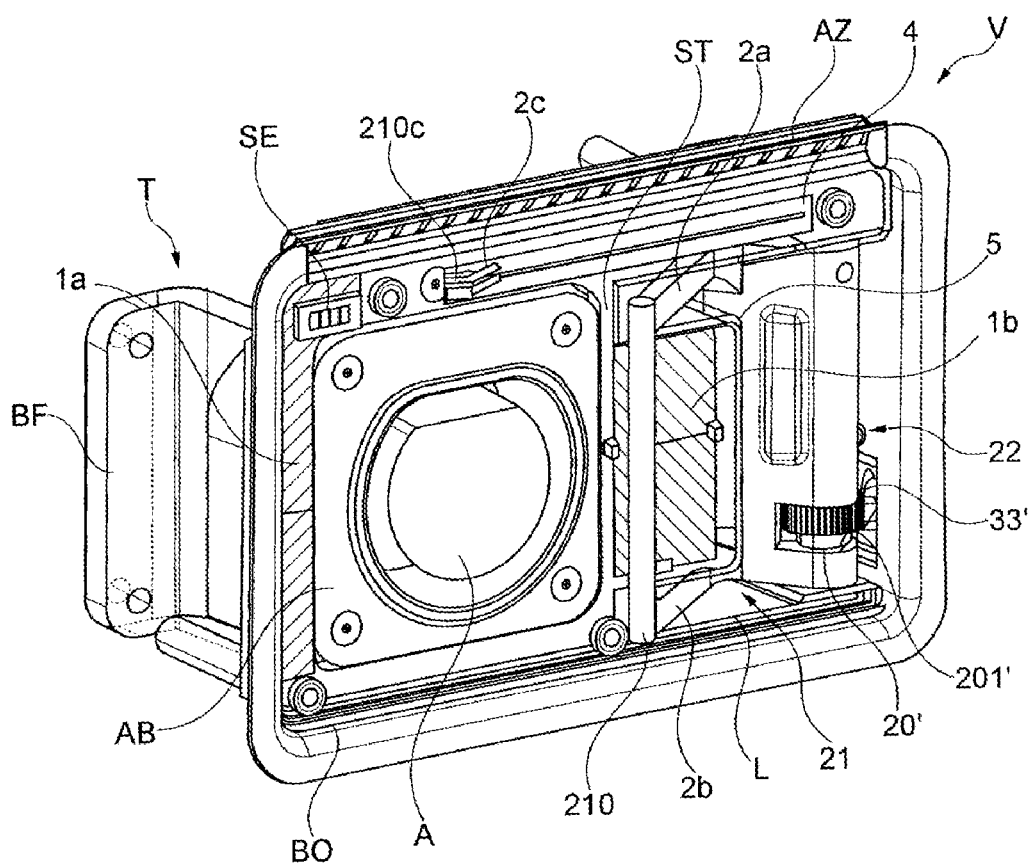
Figure 2:
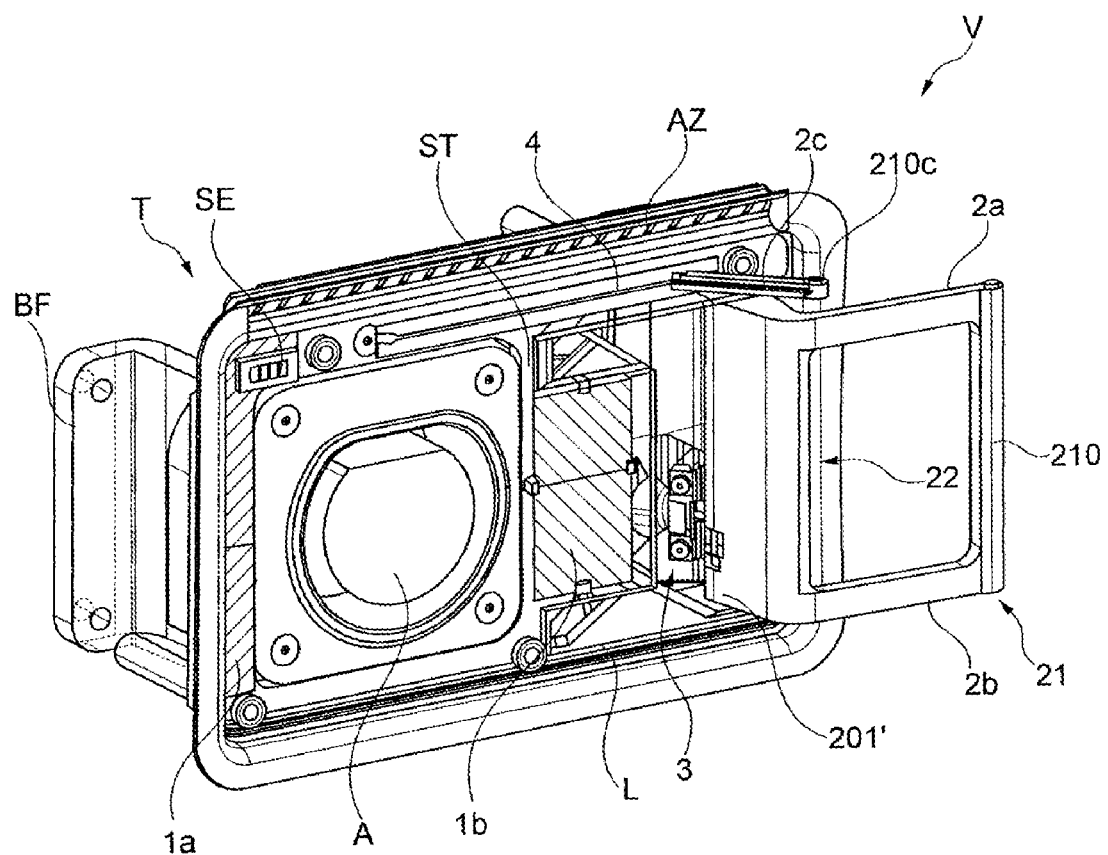

FIGS. 1A to 4C show a first exemplary embodiment of an adjustment mechanism V according to the invention. This adjustment mechanism V has a supporting frame T, provided for installation in a bodywork part of a vehicle, as a supporting structure. The supporting frame T can be fixed here to a bodywork part via an attachment part BF. The supporting frame T surrounds a closure opening BO which can be closed by a closure flap K which is adjustably mounted on the supporting frame T. A connection region AB which is surrounded by the supporting frame T is accessible via the closure opening BO when the closure flap K is opened. A connection socket A is provided at this connection region AB as a connection element for connecting a line. The connection socket A serves, for example, for plugging in a charge cable. Therefore, for example the battery of an electric vehicle can be capable of being charged via the connection socket A.

The closure flap K can be adjusted here with activation by external force by means of a drive 3, specifically essentially laterally toward the rear (or toward the front) with respect to a vehicle longitudinal axis in the correctly installed state. An adjustment movement of the closure flap K for opening and closing is controlled here by means of a motor 31 of the drive 3. Herein, by means of a gear mechanism, the motor 31 drives a lever mechanism 2 which transmits an adjustment movement to the closure flap K. The gear mechanism is formed by a first gearwheel element, driven by the motor 31, in the form of a drive worm 33' and a second gearwheel element, which meshes therewith, in the form of a gearwheel 201'.

As is illustrated, in particular, with reference to FIGS. 1A to 2B, the supporting frame T has a dividing wall ST which separates two spaces within the supporting frame T from one another transversely with respect to the direction of extent of the pivoting axis S1 and S2. In this context, the connection region AB is arranged with the connection socket A in a first space. The drive 3 is accommodated completely with the drive motor 31 and the gear mechanism in the second space which is separated therefrom, and forms a receptacle L.

In a closed state of the closure flap K, in particular an adjustment bow 21 of the adjustment mechanism is consequently completely accommodated in a closed position, in the receptacle L. This adjustment bow is formed by two pivoting levers 2a and 2b of the lever mechanism 2, which pivoting levers 2a and 2b are connected rigidly to one another at their protruding (upper) lever ends by means of connection piece 210. The adjustment bow 21 which is embodied in a U-shape therewith is held in a positively locking fashion on an inner side of the closure flap K by means of the connection piece 210, and is connected to the closure flap K in an articulated manner.

In addition, a bearing part 22 is embodied between the two other (lower) ends, coupled to the supporting frame T, of the pivoting levers 2a and 2b of the adjustment bow 21. Said bearing part 22, which is preferably manufactured from plastic, serves to support the gearwheel 201' as a second gearwheel element of a gear mechanism of the drive 3. In this context, this gearwheel 201' is arranged in a rotationally fixed fashion on the bearing part 22 by means of bearing pins 20' which protrude on opposite end sides of the gearwheel 201'. In this way, a rotation of the gearwheel 201' brings about pivoting of the adjustment bow 21 and of its two pivoting levers 2a and 2b about the pivoting axis S1.

In order to rotate the gearwheel 201', a first gearwheel element is provided in the form of a drive worm 33' of the drive 3. This drive worm 33' meshes with the gearwheel 201' in order to open and close the closure flap K. In order to ensure that during the opening and closing of the closure flap K the closure flap K also always remains oriented in parallel with the pivoting axis S1 and in parallel transversely with respect thereto in this embodiment variant, the lever mechanism 2 has, in addition to the adjustment bow 21 with the two pivoting levers 2a and 2b, a single further pivoting lever 2c. The latter cannot be driven directly by the drive motor 31 but instead is coupled to the supporting frame T and to the closure flap K about a second pivoting axis S2 and is accordingly adjusted only when the closure flap K is adjusted. The closure flap K is blocked against tilting about the pivoting axis S1 by means of the further single pivoting lever 2c, which defines a further bearing point for the closure flap K.

The single pivoting lever 2c is embodied as an angular lever. The single pivoting lever 2c is supported in this context on the supporting frame T behind a paneling part which faces the inner side of the closed closure flap K. A through-opening in the form of a longitudinally running bearing slot 4 is provided in this paneling part. The single pivoting lever 2c is guided transversely with respect to its pivoting axis S2 in this bearing slot 4 in that its lever end 210c, which is connected to the closure flap K in an articulated fashion, is plugged through the bearing slot 4. In the correctly installed state of the adjustment direction V here, the bearing slot 4 runs essentially parallel to the vehicle longitudinal axis.

In order to accommodate electronics components and parts of the drive 3 in a compact fashion, a housing part 5 is provided within the supporting frame T and, in particular, within the space which is separated off from the connection socket A by the dividing wall ST. The adjustment bow 21 engages around this housing part 5 when said adjustment bow 21 is pivoted in in accordance with FIGS. 1A and 2A, that is to say the closure flap K is located in a closed position.

In the case of the adjustment mechanism V in FIGS. 1A to 4C, the closure flap K is connected to the lever mechanism 2 in such a way that in a position of the closure flap K in which it is opened to a maximum extent said closure flap K still always at least partially covers the space with the housing part 5 and provides access only to a visible region with the connection socket A. In its open position corresponding to FIG. 3B, the closure flap K consequently covers, in particular, the adjustment bow 21 and the bearing part 22 completely, as well as the individual pivoting lever 2c.

In order to close off the connection socket A in a seal-forming fashion in the closed position of the closure flap K by means of the latter, a planar or circumferential sealing element DA is provided on an underside of the closure flap K. This sealing element DA is pressed against the connection socket A by means of the lever mechanism 2 when the closure flap K is closed. This is illustrated in more detail, in particular, by means of FIGS. 4A to 4C.

Figure 3A:
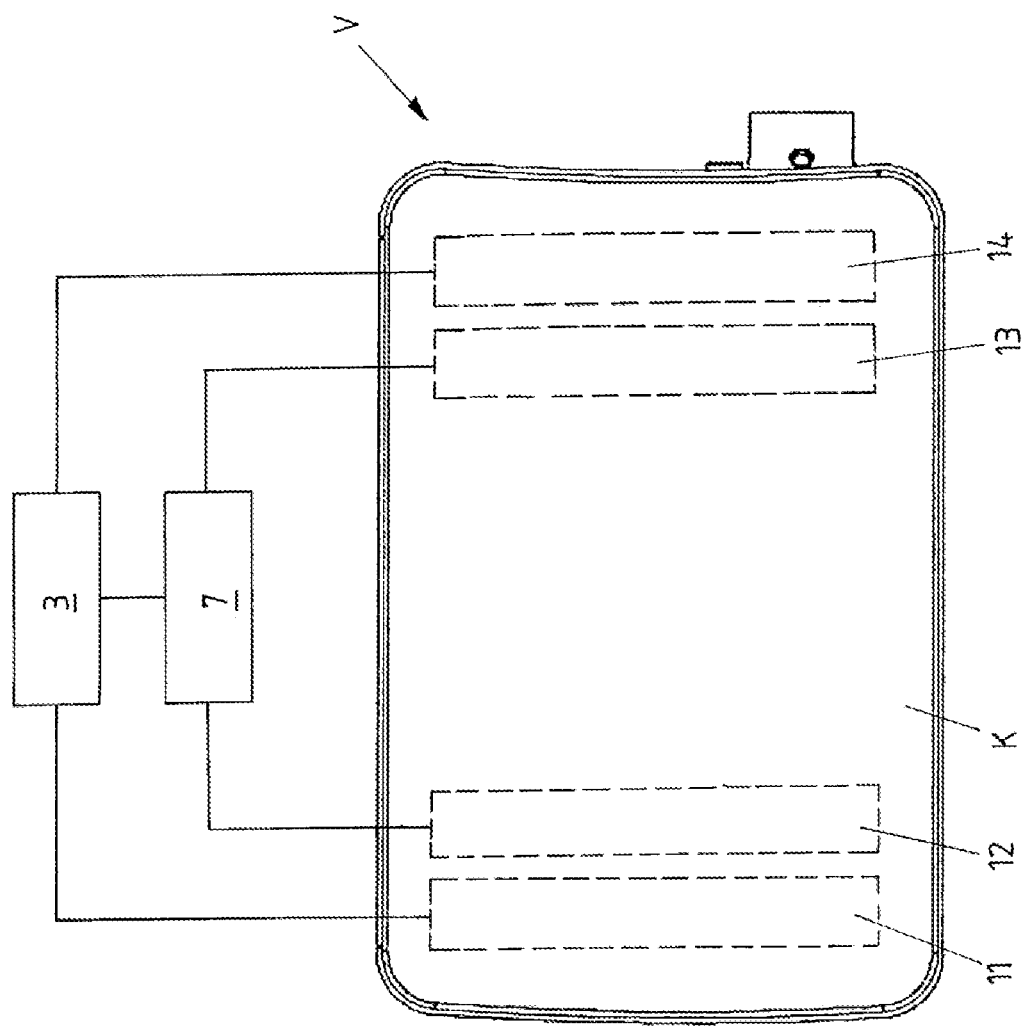

In order to adjust the closure flap K with activation by external force into the closed position in which the closure flap K completely covers the closure opening BO in accordance with the front view in FIG. 3A, an operator control element can be provided on or within the vehicle and/or on a remote control system. In the illustrated embodiment variant, an operator control element is provided (if appropriate additionally) directly in the region of the accessible connection socket A. This operator control element is equipped here with a sensor element SE by means of which an operator control event which is triggered by a user can be detected. For example, the sensor element SE is part of a capacitive sensing device for detecting in a contactless manner a movement carried out by means of a user's finger or hand as a permissible operator control event.

For the opening of the closure flap K by means of a gesture which is executed by a user, the setting mechanism V has two sensor devices 1a and 1b. The sensor devices 1a and 1b each comprise here, inter alia, at least one (sensor) electrode in order to detect capacitively a hand movement carried out in front of the closed closure flap K, in particular a wiping movement as an operator control event for the opening of the closure flap K. The sensor devices 1a and 1b each have in this context a circuit board for making electric contact between a voltage supply and an electronic control unit for actuating the drive 3. Electrodes of the control devices 1a and 1b can, for example, each be embodied by means of a leadframe and be embedded in the (plastic) material of the supporting structure T.

The two sensor devices 1a and 1b are arranged on opposite sides of the closure socket A, with the result that a wiping movement over the connection socket A by means of the two sensor devices 1a and 1b can be reliably detected. In order to make effective use of the installation space, the one (second) sensor device 1b is arranged here on the housing part 5 which protrudes in the direction of the closure flap K in the receptacle L. An installation space which is present laterally—on the right here—with respect to the connection socket A can be used to an optimum degree here, in order, on the one hand, to move the adjustment bow 21 into the closed position of the closure flap K and stow it in a compact fashion and, on the other hand, to sense contactless detection of an operator control event in the region of the adjustment bow 21. If, for example, a sensor device 1b is arranged close to a cover face, facing the closed flap K, of the housing part 5, an operator control event can be sensed in a contactless manner to a virtually optimum degree by means of changing capacitance values, in particular in the case of a closure flap K which is fabricated from plastic. It is also conceivable to provide the closure flap K, which is fabricated e.g. from plastic or some other electrically non-conductive material, with an electrically conductive element, e.g. in the form of a foil, as a capacitive coupling element. The measuring field can therefore be shaped and/or enlarged in such a way as to sense the operator control event. The electrically conductive element can be embedded e.g. in the closure flap.

For an aesthetically appealing configuration of the region of the adjustment mechanism V which can be viewed when the closure flap K is opened, in particular around the connection socket A, the sensor devices 1a and 1b are covered with a panel section B. In this context, the panel section B covers the sensor devices 1a to the left of the connection socket A, the sensor device 1b and the upper side of the housing part 5 to the right of the connection socket A as well as an edge which surrounds the connection socket A, with the result that in this way a uniform planar surface is made available. The panel section B can be formed in this context by integrally injection molded plastic material or a subsequently attached panel.

The sensor devices 1a and 1b which are spaced apart from one another can each be configured with an electrode or a plurality of electrodes, preferably two, and are provided for different functions. It is therefore possible for a gesture which is executed in front of the closed closure flap K to be detected, by means of the sensor devices 1a and 1b, as an operator control event for opening the closure flap K. In addition, when the closure flap K closes, a possible obstacle can be detected in the adjustment path of the closing closure flap K by means of the sensor devices 1a and 1b or their electrodes and an electronic control unit 7 illustrated schematically in FIG. 3A. While absolute measurement is carried out for the opening of the closure flap K by means of the sensor devices 1a and 1b, in order to determine whether in each case a capacitance value (increased with respect to a basic capacitance) exceeds a threshold value and therefore a user's hand has approached the closure flap K and executed a wiping movement, when the closure flap K moves the measured values which are acquired by means of the sensor devices 1a and 1b are compared with experiential values which serve as references. If the measured values differ from anticipated values which are stored in a memory of the electronic control unit 7 by more than a permissible extent, it is determined that there is a possible obstacle in the adjustment path of the closure flap K and, in particular, between an inner side of the closure flap K and the vehicle bodywork which can become pinched by the closing closure flap K. In such a case, the adjustment movement of the closure flap K is automatically stopped or reversed. For this purpose, the electronic control unit 7 is coupled to the drive 3.

The anticipated values which are used when the closure flap K closes have been stored, for example, by calibration in the case of obstacle-free adjustment of the opened closure flap K into its closed positon (or opened positon). Therefore, an anticipated value is respectively stored for different adjustment positions of the closure flap K relative to the supporting structure T. If appropriate, a plurality of obstacle-free adjustments can also be used in order to store a plurality of anticipated values with position resolution. When a plurality of obstacle-free adjustment cycles are used, an anticipated value can be formed and stored, for example, by a mean value of acquired measured values.

In terms of adaptive adjustment of the stored anticipated values it is possible to provide that the anticipated values are adapted automatically after a stored number of obstacle-free adjustment cycles, in order to allow for any wear phenomena or changed ambient influences. It is therefore possible to reduce the risk of incorrect triggerings of an anti-pinch mechanism which is (also) defined by means of the sensor devices 1a and 1b.

Figure 4A:
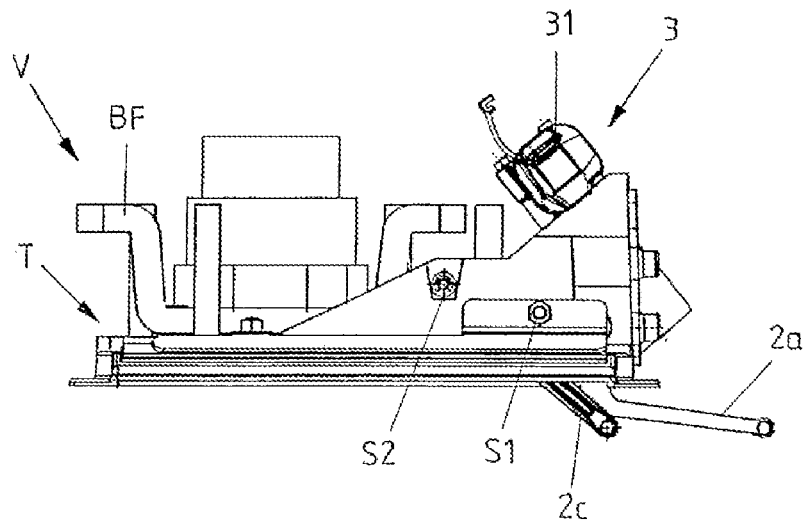
FIGS. 4A to 4C show the adjustment mechanism in FIGS. 1A to 3B in different side views.
Figure 4B:
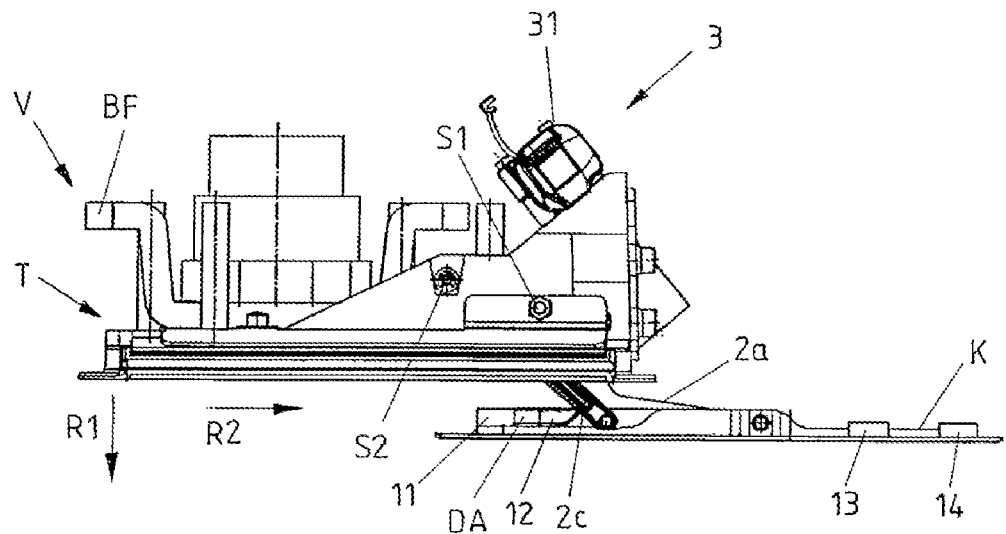
Figure 4C:
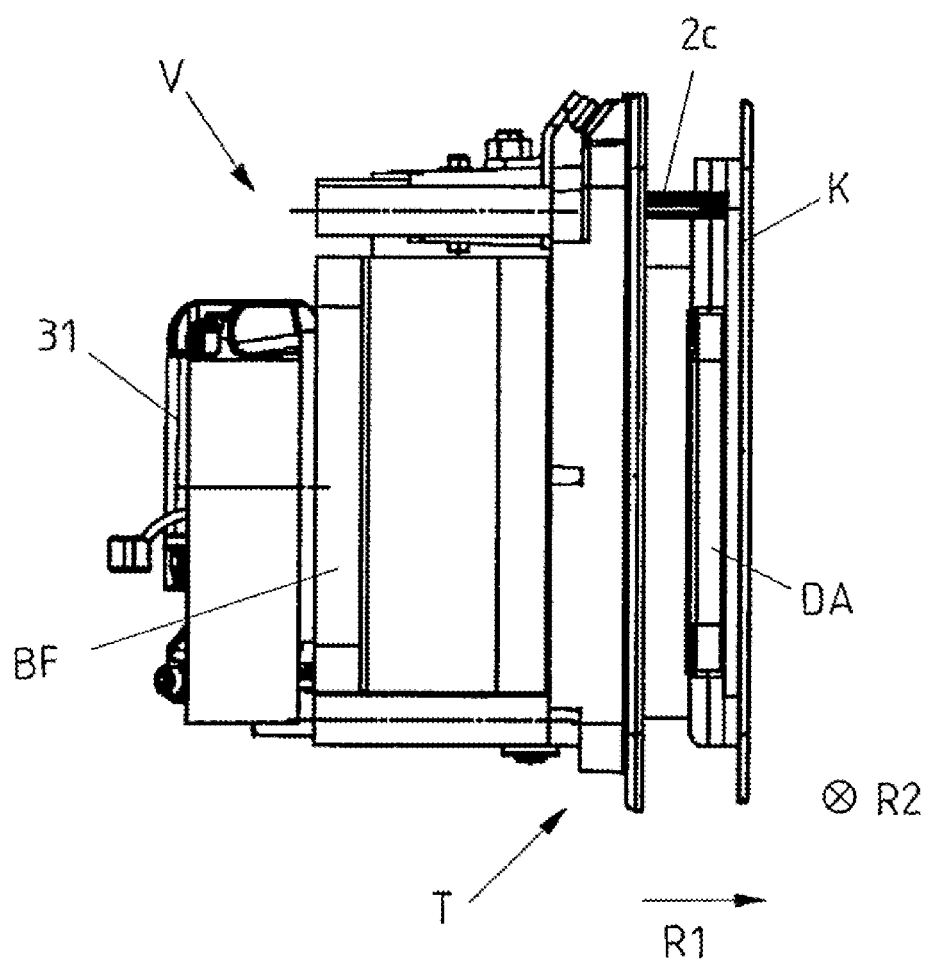
Figure 5B:
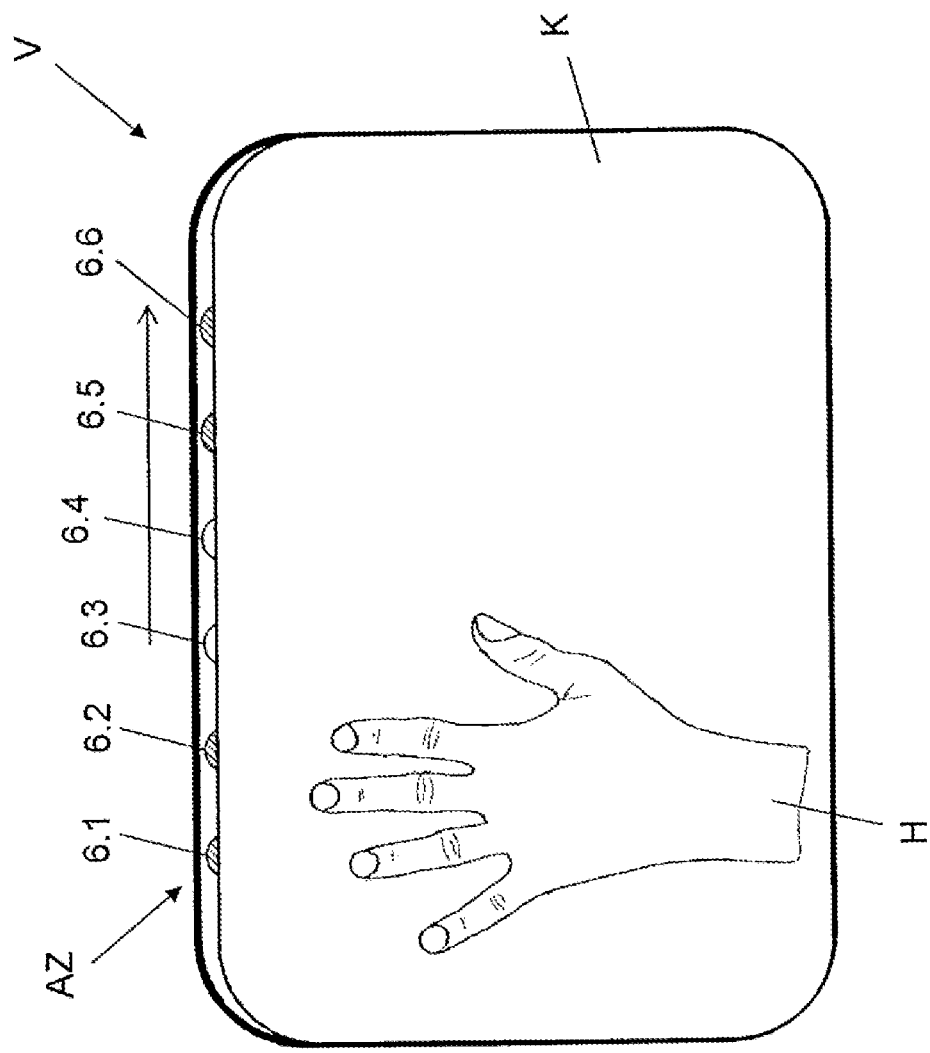
Figure 5C:
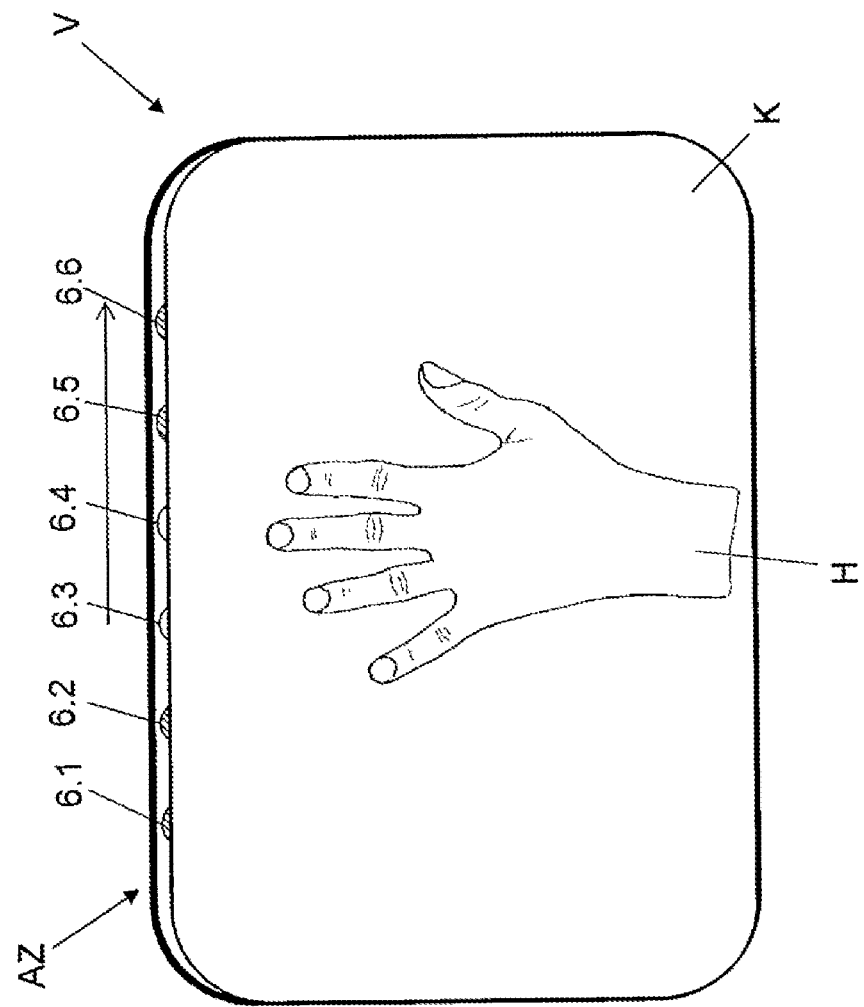
Figure 5D:
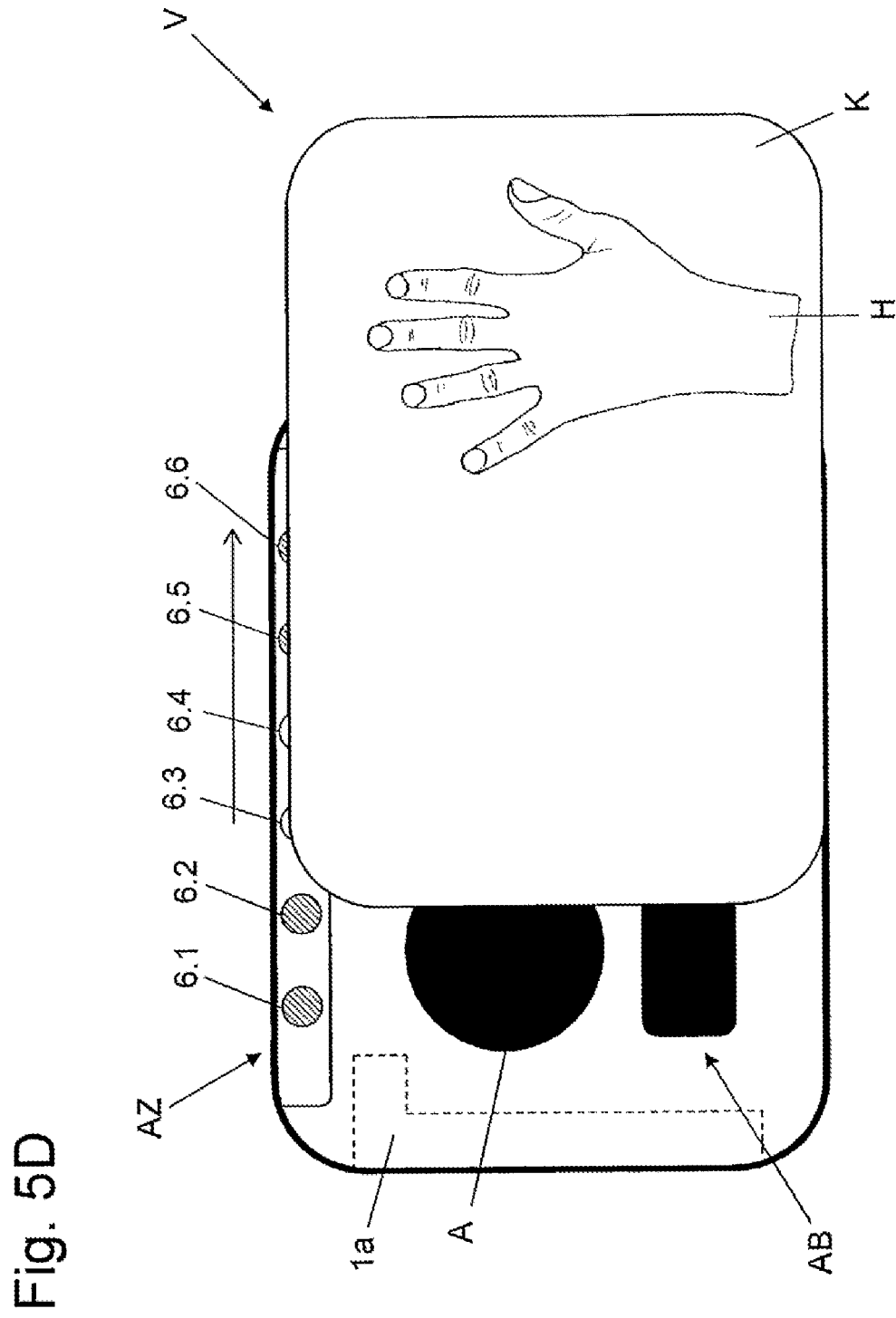

As illustrated by means of FIGS. 3A, 3B and 4B, in one embodiment variant it is also possible to provide that (additional) electrodes 11, 12, 13 and 14 are arranged on the closure flap K itself and can be used to detect a gesture for the opening and/or closing of the closure flap K. The electrodes 11, 12 and 13, 14 which are present here arranged in pairs, can be provided instead of or in addition to the electrodes of the sensor devices 1a and 1b in this context.

In one possible embodiment variant in which the electrodes 11, 12, 13 and 14 are additionally provided, a gesture for opening the closed closure flap K is detected with the latter. When the closure flap K closes, the (outer) electrodes 11, 12, 13 and 14 on the closure flap K serve as guard electrodes toward the outside for the (inner) electrodes of the sensor devices 1a and 1b, by means of which a possible obstacle in the adjustment path of the closing closure flap K is to be detected. The electrodes 11, 12, 13 and 14 of the closure flap K are therefore operated differently depending on the adjustment direction of the closure flap K. Switching over takes place from a detection function to a guard function, and vice versa, as a function of whether the closure flap K is closed is to be closed.

In one embodiment variant in which only the four electrodes 11, 12, 13 and 14 which are integrated into the closure flap K are provided, the latter can also be operated differently in pairs, specifically also as a function of whether the closure flap K is to be opened or is closed.

When the closure flap K is closed, it is evaluated, for example, by means of both electrode pairs 11, 12, 13 and 14, on the basis of stored threshold values, whether a user executes a wiping movement from left to right with his hand over the closure flap K in order to open the closure flap K, which wiping movement is then evaluated as an operator control event for triggering the opening of the closure flap K.

When the opened closure flap K closes, the edge-side electrodes 11 and 14 are, in contrast, operated as guard electrodes, while the internal electrodes 12 and 13 are used to detect a possible case of pinching during the closing of the closure flap K.

All four electrodes 11, 12, 13 and 14 are therefore also part of an anti-pinch mechanism. However, only measured values acquired from the internal electrodes 12 and 13 are compared with stored anticipated values, in order to determine a possible occurrence of pinching in the case of an inadmissible large deviation from one or a plurality of anticipated values, and to stop or reverse an adjustment of the closure flap K. However, it is also essential here that the adjustment mechanism V can not only be opened and, if appropriate, closed under gesture control but also that a capacitively operating anti-pinch mechanism is provided which is made available at least partially by means of the same electrodes which are also used for the gesture detection.

In one development there can also be provision that when the closure flap K is closed the electronic control unit 7 automatically changes into a sleep mode after a predefined time of inactivity, in order to save energy. In the sleep mode, it is monitored by just one electrode whether an object approaches the closed closure flap K. If a measured value acquired by means of this electrode exceeds a stored threshold value, the electronic control unit 7 is activated. The control unit 7 changes into an operating mode, in which with the at least one further electrode, for example one of the sensor devices 1a, 1b or one of the electrodes 11 to 14, the occurrence of a gesture in the surroundings of the closed closure flap K is monitored in order to trigger the opening of the closure flap K.

One variant which is not illustrated in the figures also provides the arrangement of electrodes at the closure flap K in such a way that at least one electrode is arranged relatively close to an inner side and at least one electrode is arranged relatively close to an outer side of the closure flap K. An (inner) electrode then serves here as a shielding when the closure flap K is closed and when opening occurs, while the other (outer) electrode is used to detect an operator control event and, if appropriate, to detect an obstacle in the adjustment path of the opening closure flap K. When the closure flap K closes, the at least one (outer) electrode then serves in turn conversely to provide shielding, while the other (inner) electrode performs a measuring function and in this context then monitors, as part of the anti-pinch mechanism, the occurrence of a potential obstacle in the adjustment path of the closing closure flap K. In this context, the individual electrodes can measure against ground (or a reference potential). In addition, in this context the electrodes can be arranged in a sandwich design one on top of the other on or in the closure flap K.

Alternatively or additionally, different measuring principles can be implemented for the opening and the closing of the closure flap K by means of single electrodes of the adjustment mechanism V. For example, a 2-electrode principle can be implemented for the opening (closing), and a single electrode principle can be implemented for the closing (opening). In the case of the 2-electrode principle, a transmitter electrode and a receiver electrode are used to measure a changing capacitance which usually becomes smaller when an object approaches the closure flap K. In the case of the single electrode principle, a capacitance against ground (or a reference potential) is measured, wherein a measured capacitance becomes larger when an object approaches.

In order also to signal visually to a user, in particular when the closure flap K is opened, the state of charge of a battery of the vehicle and/or the gesture which is to be executed in order to close the closure flap K, a display element AZ is provided (cf. in particular FIGS. 1A to 2B) which is protected in the correctly installed state by a translucent cover AD. This display element AZ can comprise, for example, a light rail with one or more LEDs. Further details for possible operation of the display element AZ are illustrated here in the FIGS. 5A to 5D explained below.

The pivoting axes S1 and S2 of the lever mechanism 2 of the embodiment variant illustrated in FIGS. 1A to 4C are provided off-center and in a region of the closure opening BO which is near to the edge. In this way, the closure flap K can be adjusted in conjunction with the pivoting levers 2a to 2c, embodied in an angular manner, in such a way that when opening occurs said closure flap K is lifted off from the connection socket A, in particular initially in a first spatial direction R1, and in an adjustment movement, on which said lifting is superimposed, is moved rearward in relation to the vehicle longitudinal axis, essentially in a second spatial direction R2 running perpendicularly with respect to said adjustment movement. In an opening position, the closure flap K is then positioned at a comparatively short distance on an adjoining outer skin of the bodywork and consequently takes up relatively little space in the opened state. The closure flap K is consequently adjusted forward to a maximum extent by means of the lever mechanism 2 during the adjustment between the closed position and the opened positon, and is therefore spaced apart to a maximum extent from the connection socket A and the outer skin of the bodywork surrounding the supporting frame T, in the spatial direction R1 running transversely with respect to the pivoting axis S1 or S2, but not in the completely opened position.

The adjustment mechanisms V which are configured according to the invention and have the lever mechanism 2 are of comparatively compact design and therefore take up little installation space on the bodywork of the vehicle. In addition, by this means it is possible to close a closure opening BO easily in a seal-forming manner in that by means of the lever mechanism 2 the closure flap K can be pulled with a sufficiently large force into or against a sealing seat.

For the purpose of simple mounting of the illustrated adjustment mechanisms V, they are preferably embodied as a prefabricated adjustment module in which the drive 3 and the lever mechanism 2 are already arranged in a functionally capable fashion on the supporting frame T which is to be inserted into a bodywork opening. If appropriate, the closure flap K can already be mounted on a prefabricated, functionally capable adjustment module with the supporting frame T, the drive 3 and the lever mechanism 2. When a sensor system is provided for detecting an operator control event on the adjustment mechanism V and/or for providing a display element AZ on the adjustment mechanism V, the respective element is preferably also already pre-mounted in a completely functional manner on the adjustment module in order to make available a pre-testable structural unit which merely has to be mounted on the bodywork part and coupled to a power supply and, if appropriate, superordinate control electronics.

FIGS. 5A to 5D illustrate a possible way of actuating the display element AZ, in order to use a plurality of lighting means of the display element AZ, here in the form of individual LEDs 6.1 to 6.6, to provide a user with, in particular, a visual indication as to how he has to move his hand H in front of the closed closure flap K in order to detect, in a contactless manner by means of a capacitive sensing device (with the sensor element SE), an operator control event for opening the closure flap K. The individual LEDs 6.1 to 6.6 are arranged here in a row one behind the other and are arranged in an edge region (the upper one here) of the closure opening BO, with the result that light emitted by the LEDs 6.1 to 6.6 can be seen even when the closure flap K is closed.

Here, a wiping movement which a user executes from left to right with his hand H in front of the closed closure flap K is evaluated by the capacitive sensing device as a permissible operator control event for opening. The gesture which is carried out with the hand H is reminiscent of a sliding movement, but in this context the hand H does not touch the closure flap K. By virtue of the fact that the individual LEDs 6.1 to 6.6 light up alternately and/or in different colors, individually, in pairs or in groups, and in this context are actuated in such a way that a light spot or light strip (if appropriate of a specific color) appears to migrate from left to right, the user is provided with the indication also to move his hand H from left to right, in order to open the closure flap K. The individual LEDs 6.1 to 6.6 light up, for example, in succession for this purpose. The visual impression of a "running light" at the edge of the closure flap K is given.

If the closure flap K is completely opened, this operating state ("closure flap opened") is displayed by means of the display element AZ, for example in that all the LEDs 6.1 to 6.6 light up together for a specific time (e.g. 3, 4 or 5 seconds), in particular with a predefined color of light, for example white.

If the closure flap K is closed, a visual signal which is representative of this is also beforehand generated by means of the LEDs 6.1 to 6.6, for example by the individual LEDs 6.1 to 6.6 flashing briefly and/or synchronously.

Furthermore, the display element AZ is embodied and actuated by display electronics here in such a way that by this means a charging progression when a charging plug is plugged into the connection socket A is also displayed visually to a user. For this purpose, for example, during the charging process the light rail of the display element AZ, defined with the LEDs 6.1 to 6.6, is used to display, for example, an increase in size of a bar which changes in color. If, for example, the battery is flat, only one LED 6.1 at the end of the light rail lights up in red. When a charging process of the battery is carried out via a connected charging plug, this LED 6.1 as well as adjacent LED 6.2 then light up in red after some time, and then three adjacent LEDs 6.1, 6.2, 6.3 light up in red. If the vehicle battery is charged further, four LEDs 6.1 to 6.4 light up in a row and then additional LEDs light up in orange. If the battery is virtually or completely charged, initially almost all, and then all, the LEDs 6.1 to 6.6 light up in green. After the conclusion of the charging process and the unplugging of a charging plug from the connection socket A, this is also acknowledged visually by means of the display element AZ.

As a result, the display element AZ on the adjustment mechanism V is therefore used not only to inform the user about an operating state of the adjustment mechanism V and a state of charge of a battery of the vehicle, but also to display to the user a visual indication of the hand movement which has to be carried out in order to adjust the closure flap K.

For example, the closure flap K can be opened in combination with the display element AZ in FIGS. 5A to 5D if a user's hand H initially approaches the first (left-hand) electrode pair 11, 12, with the result that a significant change in the capacitance which is sensed by this means is detected, the user's hand H then remains in the approached position for a defined time period (e.g. 1s) until the display element AZ is used to signal visually to the user that he should move his hand to the right and therefore execute a wiping movement to the right, and the user actually moves his hand to the right, with the result that a characteristic (relatively large) sensor deflection can be detected by means of the second electrode pair 13, 14 (as can a drop at the first electrode pair 11, 12).

Closing of the closure flap K is, in contrast, triggered by touching or pressing the additionally provided sensor element SE. In this context, e.g. the (inner) electrodes of the sensor devices 1a and 1b are operated as part of an anti-pinch mechanism, in order to detect a possible obstacle in the adjustment path of the closing closure flap K and automatically stop or reverse the adjustment movement of the closure flap K before an occurrence of pinching. The (outer) electrodes 11, 12, 13, 14 which are provided on the closure flap K are then operated in this context for the purpose of providing shielding, in order to avoid detecting objects which are present on the outer side of the closure flap K as possible obstacles.

LIST OF REFERENCE SYMBOLS

1a, 1b Sensor device/electrode
11-14 Sensor electrode
2 Lever mechanism
20 Drive shaft
20' Bearing pin
201' Gearwheel ($2^{nd}$ gearwheel element)
21 Adjustment bow
210 Connection piece
210c Lever end
22 Bearing part
2a-2c Pivoting lever
3 Drive
31 Motor
33' Drive worm ($1^{st}$ gearwheel element)
4 Bearing slot (through-opening)
5 Housing part
6.1-6.6 LED (lighting means)
7 Electronic control unit
A Connection socket (connection element)
AB Connection region
AD Cover
AZ Display element
B Panel section
CF Attachment part
BO Closure opening
DA Sealing element
H Hand
K Closure flap
L Receptacle
R1,R2 Direction
S1,S2 Pivoting axis
SE Sensor element
ST Dividing wall
T Supporting frame (supporting structure)
V Adjustment mechanism

The invention claimed is:

1. An adjustment mechanism comprising
    a closure flap for at least partially closing a closure opening on a vehicle, via which, when the closure flap is opened, a connection element for connecting a line and/or a port for topping up a liquid is accessible,
    a drive for adjusting the closure flap by external force in response to an operator control event,
    an electronic control unit which is coupled to the drive and via which the drive is activated to open the closure flap in response to an operator control event which is detected in a contactless manner, and, on the other hand, is automatically stopped or reversed in so far as, when the closure flap closes, a possible obstacle is detected in a contactless manner in the adjustment path of the closure flap via an anti-pinch mechanism, and
    at least two electrodes which are configured to both detect a specific gesture of a user, executed in the surroundings of the closed closure flap, as an operator control event in order to open the closure flap and to determine in a contactless manner a possible obstacle in the adjustment path of the closure flap as part of the anti-pinch mechanism.

2. The adjustment mechanism as claimed in claim 1, wherein the electronic control unit is configured
    (a) to evaluate, for the opening of the closure flap, whether a measured value exceeds threshold value, and
    (b) to compare, when the closure flap closes, at least one measured value with an anticipated value.

3. The adjustment mechanism as claimed in claim 2, wherein a memory is provided in which an anticipated value is respectively stored for different positions of the closure flap along an adjustment path, and the electronic control unit is configured to carry out, when the closure flap closes, a position-resolved comparison of measured values with the stored anticipated values.

4. The adjustment mechanism as claimed in claim 2, wherein the electronic control unit is configured to trigger opening of the closure flap if the threshold value is exceeded at least for a predefined time period.

5. The adjustment mechanism as claimed in claim 2, wherein the at least two electrodes and the electronic control unit are configured
    to acquire, when the closure flap closes, measured values and compare them with anticipated values stored in the electronic control unit in order to determine in a contactless manner the possible obstacle in the adjustment path of the closure flap.

6. The adjustment mechanism as claimed in claim 1, wherein the electronic control unit is configured to evaluate, for the opening of the closure flap, whether measured values, acquired via different electrodes, in a predefined sequence exceed first and second threshold values.

7. The adjustment mechanism as claimed in claim 2, wherein one electrode of the at least two electrodes
    (a) is used to acquire a measured value for the opening of the closure flap, in order to detect an operator control event, and
    (b) is used for electromagnetic shielding when the closure flap closes.

8. The adjustment mechanism as claimed in claim 7, wherein a first electrode of the at least two electrodes is provided as part of the anti-pinch mechanism via which a measured value for detecting a possible obstacle in the adjustment path of the closure flap to be closed is acquired, wherein a second electrode of the at least two electrodes which is used for the opening of the closure flap to detect an operator control event is used, when the closure flap closes, as a guard electrode for the first electrode.

9. The adjustment mechanism as claimed in claim 7, wherein at least three electrodes are provided, and in that the electrodes and the electronic control unit are configured
  (a) to detect, for the opening of the closure flap by means of some of the electrodes, a specific gesture of a user, executed in the surroundings of the closed closure flap, as an operator control event, and
  (b) to acquire measured values via some other of the electrodes when the closure flap closes and compare said measured values with anticipated values stored in the electronic control unit, in order to determine in a contactless manner a possible obstacle in the adjustment path of the closure flap.

10. The adjustment mechanism as claimed in claim 9, wherein at least two of the electrodes are provided for detecting the gesture, and two of the electrodes are provided for detecting a possible obstacle, and at least one electrode, which is used to detect a gesture for opening the closure flap when the closure flap is closed is provided to be used as a guard electrode when the closure flap closes.

11. The adjustment mechanism as claimed in claim 8, wherein a second electrode which is used as a guard electrode when the closure flap closes is connected to ground.

12. The adjustment mechanism as claimed in claim 1, wherein at least one electrode is arranged in a supporting structure, having the connection element and/or the port, of the adjustment mechanism or on the closure flap.

13. A method for controlling the adjustment movement of a closure flap by means of which a closure opening on a vehicle can be closed at least partially, via which closure opening a connection element for connecting a line and/or a port for topping up a liquid is accessible when the closure flap is opened, and which can be adjusted by external force by means of a drive,
  wherein the drive is activated, on the one hand, in response to an operator control event which is detected in a contactless manner, to open the closure flap, and, on the other hand, is stopped or reversed automatically in so far as, when the closure flap closes, a possible obstacle in the adjustment path of the closure flap is detected in a contactless manner by means of an anti-pinch mechanism; and
  wherein at least two electrodes are configured both for detecting a specific gesture of a user, executed in the surroundings of the closed closure flap, as an operator control event in order to open the closure flap and as part of the anti-pinch mechanism when the closure flap closes, for determining in a contactless manner a possible obstacle in the adjustment path of the closure flap.

14. The method as claimed in claim 13, wherein
  (a) for the opening of the closure flap it is evaluated whether a measured value which is acquired by means of at least one electrode of the at least two electrodes exceeds a threshold value, and
  (b) when the closure flap closes, at least one measured value which is acquired via the at least one electrode is compared with an anticipated value.

15. The method as claimed in claim 13, wherein at least one electrode of the at least two electrodes
  (a) is used to acquire a measured value for the opening of the closure flap, in order to detect the operator control event which triggers the opening of the closure flap, and
  (b) is used for electromagnetic shielding when the closure flap closes.

* * * * *